United States Patent
Lee et al.

(10) Patent No.: US 10,255,367 B2
(45) Date of Patent: Apr. 9, 2019

(54) VESSEL TRAFFIC SERVICE SYSTEM AND METHOD FOR EXTRACTING ACCIDENT DATA

(71) Applicant: Electronics and Telecommunications Research Institute, Daejeon (KR)

(72) Inventors: Byung Gil Lee, Daejeon (KR); Byung Doo Kim, Daejeon (KR); Do Hyeung Kim, Daejeon (KR); Kwan Tae Cho, Daejeon (KR); Ju Young Kim, Gyeongsangnam-do (KR); Joong Yong Choi, Gyeonggi-do (KR); Dae Hee Seo, Daejeon (KR); Seung Hee Oh, Daejeon (KR); Jung Chan Na, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 818 days.

(21) Appl. No.: 14/643,572

(22) Filed: Mar. 10, 2015

(65) Prior Publication Data

US 2015/0261869 A1    Sep. 17, 2015

(30) Foreign Application Priority Data

Mar. 13, 2014    (KR) .................. 10-2014-0029387

(51) Int. Cl.
*G06F 17/30* (2006.01)
*G01S 13/86* (2006.01)
(Continued)

(52) U.S. Cl.
CPC ...... *G06F 17/30867* (2013.01); *G01S 5/0027* (2013.01); *G01S 13/86* (2013.01);
(Continued)

(58) Field of Classification Search
CPC ......... G06F 17/30867; G06F 17/30598; G06F 17/30554; G06F 17/30011;
(Continued)

(56) References Cited

U.S. PATENT DOCUMENTS

| | | | | |
|---|---|---|---|---|
| 5,270,708 A | * | 12/1993 | Kamishima | ........ G01C 21/3697 340/905 |
| 7,047,114 B1 | * | 5/2006 | Rogers | ..................... G08G 3/02 340/438 |

(Continued)

FOREIGN PATENT DOCUMENTS

| | | |
|---|---|---|
| CN | 101551946 A * | 10/2009 |
| KR | 10-0990764 B1 | 10/2010 |

(Continued)

OTHER PUBLICATIONS

High Performance Multi-Track Recording System for Automotive Applications, A. Broggi, S. Debattisti, M. Panciroli, P. Grisleri, International Journal of Automotive Technology, vol. 13, No. 1, pp. 123-132 (2012).

*Primary Examiner* — Dung K Chau
(74) *Attorney, Agent, or Firm* — Nelson Mullins Riley & Scarborough LLP; Anthony A. Laurentano (57) ABSTRACT

The present invention relates to a vessel traffic service system and a method for extracting accident data, and more particularly, to a technique that search and extracts possible event traffic data automatically from data of a concerned area without knowing exact time when a marine accident occurs. The vessel traffic service system includes: an input unit receiving conditional information for extracting accident occurrence data from a user; a storage unit storing at least one of an automatic identification system (AIS) signal, a radar signal, and a camera image signal; and a control unit extracting an event occurrence part from at least one of the AIS signal, the radar signal, and the camera image signal of (Continued)

a point and a time at which an accident occurs in accordance with the conditional information to generate an accident candidate list.

13 Claims, 9 Drawing Sheets

(51) Int. Cl.
*G01S 13/91* (2006.01)
*G01S 5/00* (2006.01)
*G01S 7/12* (2006.01)
*G01S 7/16* (2006.01)

(52) U.S. Cl.
CPC ............ *G01S 13/867* (2013.01); *G01S 13/91* (2013.01); *G06F 17/30241* (2013.01); *G06F 17/30244* (2013.01); *G06F 17/30247* (2013.01); *G06F 17/30994* (2013.01); *G01S 7/12* (2013.01); *G01S 7/16* (2013.01); *G01S 2205/002* (2013.01)

(58) Field of Classification Search
CPC ......... G06F 17/30979; G06F 17/30017; B63H 21/21; B63H 25/04; B63H 25/42; B63B 43/18
USPC ............................ 707/710, 728, 740; 701/21
See application file for complete search history.

(56) References Cited

U.S. PATENT DOCUMENTS

| | | | |
|---|---|---|---|
| 2002/0194016 A1* | 12/2002 | Moribe | G01C 21/3697 701/469 |
| 2010/0030540 A1* | 2/2010 | Choi | G06Q 40/08 703/8 |
| 2010/0082533 A1* | 4/2010 | Nakamura | G06F 17/30345 707/609 |
| 2016/0031536 A1* | 2/2016 | Kim | B63B 49/00 701/21 |

FOREIGN PATENT DOCUMENTS

| | | |
|---|---|---|
| KR | 10-2011-0033599 A | 3/2011 |
| KR | 20110070481 A | 6/2011 |
| KR | 10-2012-0071248 A | 7/2012 |
| KR | 10-2013-0011568 A | 1/2013 |
| KR | 20130052287 A | 5/2013 |

\* cited by examiner

<ACCUMULATED    <DIFFERENCE IMAGE 1>    <DIFFERENCE IMAGE 2>
 DIFFERENCE
   IMAGE>

VESSEL TRAFFIC SERVICE SYSTEM AND METHOD FOR EXTRACTING ACCIDENT DATA

CROSS-REFERENCE TO RELATED APPLICATIONS

This application claims priority to and the benefit of Korean Patent Application No. 10-2014-0029387 filed in the Korean Intellectual Property Office on Mar. 13, 2014, the entire contents of which are incorporated herein by reference.

TECHNICAL FIELD

The present invention relates to a vessel traffic service system and a method for extracting accident data, and more particularly, to a technique that extracts accident data from data of a concerned area when a marine accident occurs.

BACKGROUND ART

A vessel traffic service system (VTS) is a system for preventing various marine accidents which occur at Korean harbors or costal waters or minimizing damages. That is, a marine traffic safety control system is a system that builds up an emergency reaction management and supporting system for preventing a vessel accident in controlled waters and minimizing damages to a marine environment when a marine accident occurs in the controlled waters.

The VTS is built up to smoothly control traffic flow of vessels that sail in the controlled waters and prevent a collision or the sinking of the vessel. Further, burdening information of the vessel depending on weather information is rapidly provided to move the vessel to safe waters or control a departure time of the vessel.

A technique has been developed, which latitude and longitude, and coordinate information of the vessel are automatically transmitted to the VTS by installing an automatic identification system (AIS) in the vessel for managing the vessel to automatically track a route of the vessel.

However, the AIS is not installed in most vessels due to problems such as expense for the AIS, and the like and when an accident occurs in the vessels, the vessels may be discovered after a lot of time elapsed since the accident. Further, there are many cases that even in the case of destruction of fisheries, the accident is not immediately discovered and is discovered after a lot of time elapsed.

When an accident spot is not accurate as such, image data for all time estimated as an accident time needs to be individually monitored by a person. Therefore, a marine accident in which the accident time is not clear had a problem in that a lot of time and efforts for determining data at the time of the accident are required.

SUMMARY OF THE INVENTION

The present invention has been made in an effort to rapidly determine accident data of a marine accident discovered after the time of an accident.

An exemplary embodiment of the present invention provides a vessel traffic service system including: an input unit receiving conditional information for searching and extracting accident candidate data at a recorded large amount of traffic data from a user; a storage unit storing at least one of an automatic identification system (AIS) signal, a radar signal, and a camera image signal; and a control unit extracting an event occurrence part from at least one of the AIS signal, the radar signal, and the camera image signal of a point and a time at which an accident occurs in accordance with the conditional information to generate an accident candidate list.

The conditional information may include information of at least one of a concerned area which is the accident occurrence point, a concerned time range which is an accident occurrence time range, and equipment to be searched, which monitors the sea.

The control unit generates and accumulates a difference image from the radar signal and records a case in which a vessel is displayed in the difference image to generate a radar accident candidate list.

The control unit generates and accumulates the difference image from the camera image signal and records the case in which a vessel is displayed in the difference image to generate a camera accident candidate list.

When a vessel coordinate which matches a latitude/longitude coordinate of the concerned area where the accident occurs is included in the AIS signal, the control unit records information on the corresponding vessel to generate an AIS accident candidate list.

The vessel traffic service system may further include a display unit displaying on a screen at least on of the radar accident candidate list, the camera accident candidate list, and the AIS accident candidate list.

The display unit and the input unit are separated from the control unit to include an operator computer formed outside.

Another exemplary embodiment of the present invention provides a method for extracting marine accident data, including: receiving condition information for extracting marine accident data from a user; receiving data corresponding to the conditional information from equipment to be searched, which monitors the sea; and extracting an event occurrence part among the data corresponding to the conditional information and recording the extracted event to generate an accident candidate list for each equipment to be searched.

The conditional information may include information of at least one of a concerned area which is the accident occurrence point, a concerned time range which is an accident occurrence time range, and equipment to be searched, which monitors the sea.

In the receiving of the data corresponding to the conditional information, a coordinate value may be calculated for each equipment to be searched with respect to the concerned area.

In the receiving of the data corresponding to the conditional information, a coordinate value may be calculated for each equipment to be searched with respect to the concerned area.

In the generating of the accident candidate list, when the data corresponding to the conditional information is a camera image signal, an inter-frame difference image of the camera image signal may be generated and accumulated and thereafter, when a vessel exists in the difference image, a time and a position at which the vessel exists are recorded in the accident candidate list to generate a camera accident candidate list.

When an image value of an object displayed in the difference image is larger than a predetermined target detection level value, it may be determined that the object is the vessel and the vessel may be recorded in the accident candidate list.

In the generating of the accident candidate list, when the data corresponding to the conditional information is a radar signal, a difference image may be generated and accumulated by the unit of scan with respect to the radar signal and thereafter, when a vessel exists in the difference image, a time and a position at which the vessel exists are recorded in the accident candidate list to generate a radar accident candidate list.

When an image value of an object displayed in the difference image is larger than a predetermined target detection level value, it may be determined that the object is the vessel and the vessel may be recorded in the accident candidate list.

In the generating of the accident candidate list, when the data corresponding to the conditional information is an AIS signal, it may be determined whether the vessel exists in a range of a latitude/longitude coordinate of the concerned area among latitude/longitude coordinate values of the vessel, which are included in the AIS signal and when the vessel exists in the latitude/longitude coordinate of the concerned range, the vessel may be recorded in the accident candidate list to generate the AIS accident candidate list.

The method may further include displaying on the screen at least one of the accident candidate lists for each equipment to be searched.

According to exemplary embodiments of the present invention, data at a time of an accident is rapidly extracted with respect to a marine accident discovered after the accident time in the sea to minimize time and expense consumed for handling the accident.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, t describe the present invention in detail so as for those skilled in the art to easily carry out the technical spirit of the present invention, exemplary embodiments of the present invention will be described with reference to the accompanying drawings. When reference numerals refer to components of each drawing, it is to be noted that although the same components are illustrated in different drawings, the same components are denoted by the same reference numerals as possible. In describing the present invention, when it is determined that the detailed description of the known art related to the present invention may obscure the gist of the present invention, the detailed description thereof will be omitted. Further, hereinafter, exemplary embodiments of the present invention will be described. However, it should be understood that a technical spirit of the invention is not limited to the specific embodiments, but the present invention may be changed or modified by those skilled in the art.

The present invention is a technique that sets a concerned area based on an accident occurrence prediction point when a vessel accident occurs in the sea, primarily extracts a part where an event occurs in the concerned area to generate an accident candidate list and provide the generated accident candidate list to a controller, thereby rapidly and easily finding data regarding the vessel in the accident.

Hereinafter, exemplary embodiments of the present invention will be described in detail with reference to FIGS. 1 to 9.

Figure 1:
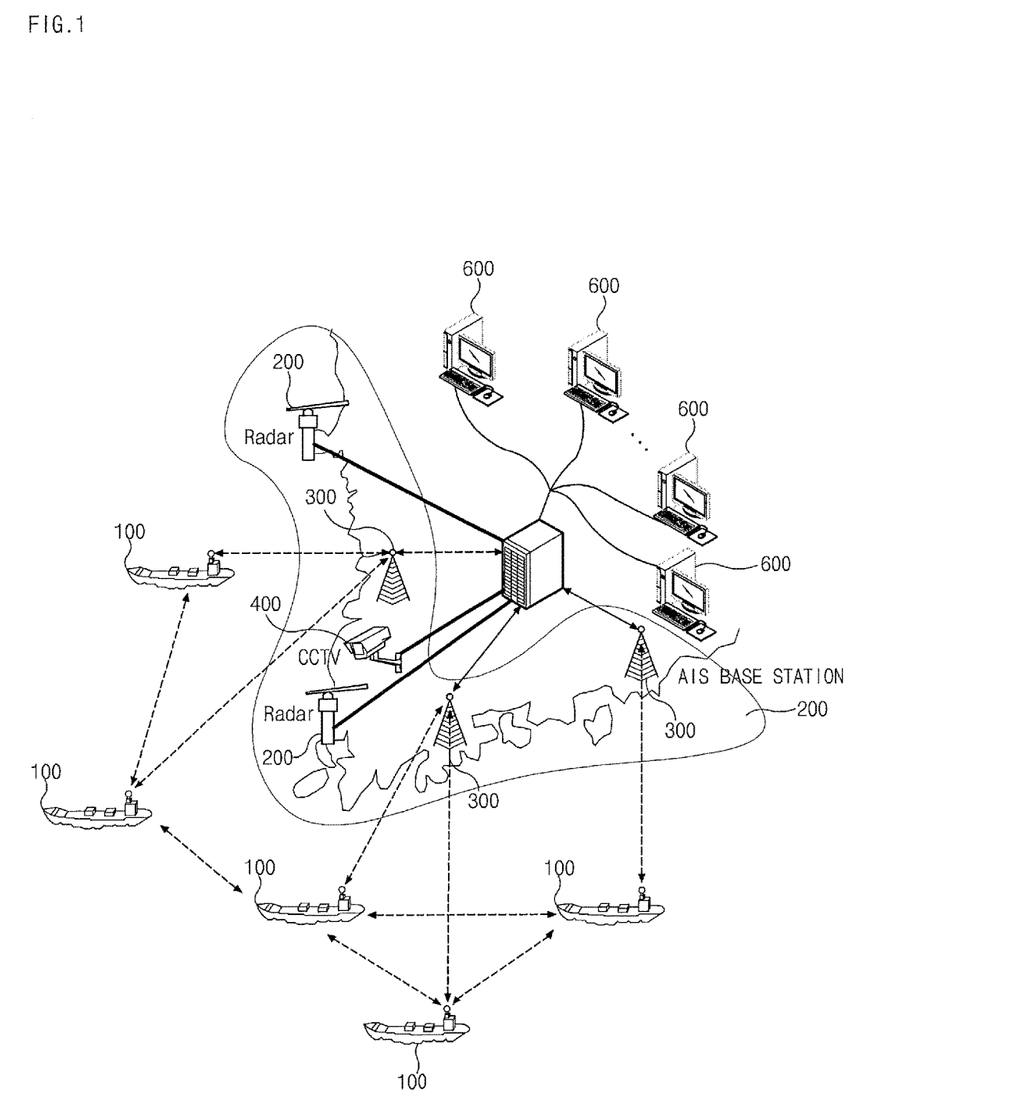
FIG. 1 is an overall configuration diagram of a vessel traffic service system according to an exemplary embodiment of the present invention.

FIG. 1 is an overall configuration diagram of a vessel traffic service system according to an exemplary embodiment of the present invention.

The vessel traffic service system according to the exemplary embodiment of the present invention includes a radar 200, an automatic identification system (AIS) base station 300, a CCTV camera 400, and a control center 500.

A radar 200 transmits a signal while rotating at a predetermined cycle and receives signals reflected by topographies such as a land and a building, a target such as a vessel, and the sea such as the waves. The radar 200 transmits the received signals to the control center 500.

The AIS base station 300 relays communication between the vessel 100 and the control center 500. That is, the AIS base station 300 receives an AIS signal from the vessel 100 with the AIS and transmits the received AIS signal to the control center 500.

The CCTV camera 400 picks up an image of the sea and transmits the picked-up image to the control center 500.

The control center 500 receives a radar signal from the radar 200, receives the AIS signal from the AIS base station 300, receives a camera image signal from the CCTV camera 400, and generates respective accident candidate lists from information on each equipment which is received.

To this end, the control center 500 receives conditional information (a concerned area, a concerned time range, and equipment to be searched) from a controller and generates an accident candidate list by inquiring data suitable for the corresponding conditional information. In this case, the conditional information is information on the concerned area, the concerned time range, and the equipment to be searched. That is, the concerned area corresponds to a point whether an accident occurs, the concerned time range means a range of a time estimated as the time when the accident occurs, and the equipment to be searched may include the CCTV camera 400, the AIS base station 300, and the radar 200. In this case, as the equipment to be searched, at least one may be selected and all of three types of the CCTV camera 400, the AIS base station 300, and the radar 200 or one or two among them may be selected.

The control center 500 performs a signal processing procedure such as noise processing with respect to the camera image signal received from the CCTV camera 400 and generates a difference image with respect to the camera image signal for each predetermined time and thereafter, compares a level value of the difference image and a predetermined detection level set value to generate a camera accident candidate list.

The control center 500 performs the signal processing procedure for noise and clutter with respect to the radar signal received from the radar 200 and converts the radar signal into a B-scope image or a PPI format. Thereafter, the control center 500 transmits a PPI image to an operator computer 600 and displays the PPI image on a screen, generates the difference image from the B-scope image and compares the level value of the difference image and the predetermined detection level set value to generate a radar accident candidate list.

The control center 500 determines latitude and longitude information from the AIS signal received from the AIS base station 300 and extracts a vessel that sails on a latitude and a longitude of the concerned area within the concerned time range to generate an AIS accident candidate list.

The operator computer 600 receives the camera accident candidate list, the radar accident candidate list, and the AIS accident candidate list from the control center 500 and displays the received lists on the screen. In FIG. 1, a configuration in which the operator computer 600 is separated from the control center 500 is disclosed, but the present invention is not limited thereto and the operator computer 600 may be configured to be included in the control center 500.

Figure 2:
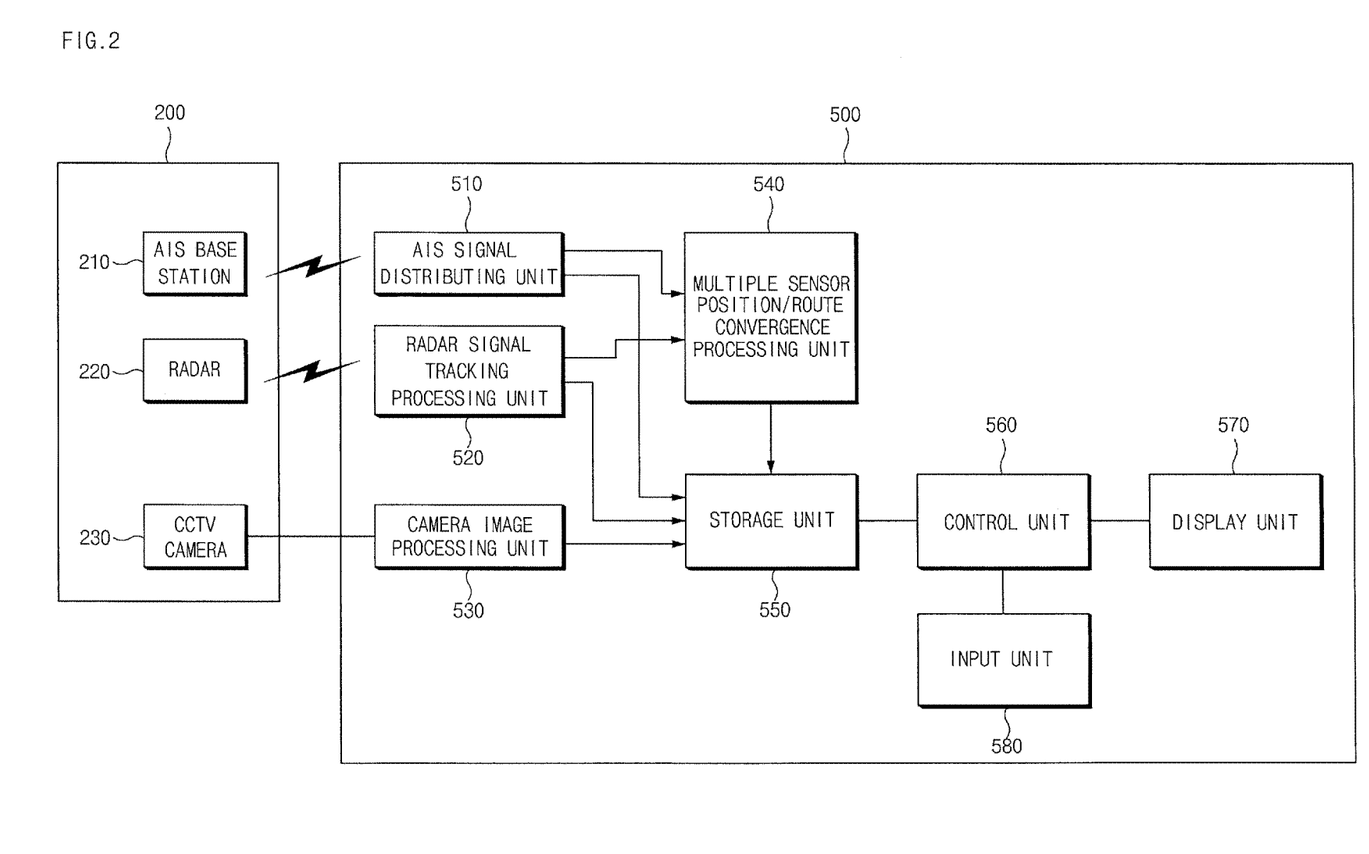
FIG. 2 is a detailed configuration diagram of the vessel traffic service system according to the exemplary embodiment of the present invention.

As illustrated in FIG. 2, the control center 500 includes an AIS signal distributing unit 510, a radar signal tracking processing unit 520, a camera image processing unit 530, a multiple sensor position/route convergence processing unit 540, a storage unit 550, a control unit 560, a display unit 570, and an input unit 580.

The AIS signal distributing unit 510 receives the AIS signal from the AIS base station 300 and integrates multiple AIS base station information.

The radar signal tracking processing unit 520 receives the radar signal from the radar 200 and detects a vessel target from the received radar signal and tracks the detected vessel target and transfers the tracking result to the multiple sensor position/route convergence processing unit 540. Further, the radar signal tracking processing unit 520 converts the radar signal into the B-scope image illustrated in FIG. 8 or the PPI image illustrated in FIG. 9. In this case, the B-scope image represents an echo intensity detected by the radar by using a distance up to the detected target as a Y axis and an azimuth of the target as an X axis and is used to generate the difference image. Meanwhile, the PPI image is acquired by converting the B-scope image into a circular shape and represents two dimensional echoed object information by a scan line which rotates clockwise and includes an image displayed according to an observation distance at a given altitude angle.

The camera image processing unit 530 receives the image data from the CCTV camera 400 and performs signal processing of the image data.

The multiple sensor position/route convergence processing unit 540 combines and converges multiple radar signals and AIS signals to decide an accurate vessel position and an accurate vessel course.

The storage unit 550 stores multiple radar signals, AIS signals, camera image signals, and the like.

The control unit 560 receives the conditional information (the concerned area, the concerned time range, and the equipment to be searched), and extracts signals suitable for the conditional information among the signals received from the AIS base station 300, the radar 200, and the CCTV camera 400 to generate the respective accident candidate lists. In this case, the respective accident candidate lists are generated for each equipment to be searched and are separated into the AIS accident candidate list, the radar accident candidate list, and the camera accident candidate list to be generated.

To this end, the control unit 560 calculates a coordinates for each equipment to be searched. In this case, when the equipment to be searched is the CCTV camera, the concerned area is converted into a latitude/longitude coordinate system and a camera coordinate value is calculated. Further, the control unit 560 calculates a coordinate value of an image for the concerned area when the equipment to be searched is the radar and calculates a latitude/longitude value for the concerned area when the equipment to be searched is the AIS base station.

When the equipment to be searched is the CCTV camera 400, the control unit 560 generates and accumulates a difference image between frames of the camera image signal corresponding to the concerned area and thereafter, compares an image value of an object displayed in the difference image and the target detection level set value to determine that the object displayed on the difference image is a vessel when an image value of the object displayed on the difference image is larger than the target detection level set value (threshold value) and detects time and positional information to generate the camera accident candidate list. In this case, the target detection level set value means an image value which may be estimated as the vessel (target) in the camera image signal.

The control unit 560 generates a difference image for the radar image signal corresponding to the concerned area and accumulates the generated difference image when the equipment to be searched is the radar 200. In this case, a preprocessing procedure for the radar image signal may be performed before generating the difference image for the radar image signal. The preprocessing procedure sets an area to be excluded from searching in order to prevent an unnecessary processing error when a fixed radar area such as an island or a land is included in the concerned area.

That is, when the island or the land is included in the concerned area, an area to be excluded from the signal processing such as the generation of the difference image is set and processed with respect to the fixed area of the radar, which the concerned area may unnecessarily confuse radar processing to enable efficient and rapid processing. After the preprocessing is performed, the difference image is generated by the unit of the frame according to a radar rotation cycle based on radar information and the generated difference image is accumulated. In this case, the radar signal received from the radar 200 is converted into the B-scope image format by the radar signal tracking processing unit 520 to be stored. The control unit 560 reads the B-scope image in a memory to generate the difference image and converts the generation difference image into the PPI image to display the converted PPI image on the screen. Further, the radar signal tracking processing unit 520 may store the corresponding image in the PPI format for rapid processing efficiency and the control unit 560 may generate a difference image between the PPI images. Thereafter, the control unit 560 compares the image value of the object displayed in the generated difference image and the predetermined target detection set value to determine that the object displayed in the difference image is the vessel when the image value of the object displayed in the difference image is larger than the target detection level set value and detects the time and positional information to generate the radar accident candidate list.

When the equipment to be searched is the AIS base station 300, the control unit 560 compares a target coordinate (vessel coordinate) among the AIS signals with a latitude/longitude coordinate range of the concerned area and records the corresponding vessel in the accident candidate list to generate the AIS accident candidate list when the vessel that exists in the latitude/longitude coordinate range of the concerned area exists.

The display unit 570 may display the camera accident candidate list, the radar accident candidate list, and the AIS accident candidate list on the screen and display the radar signal in the radar accident candidate list in the PPI format. In this case, the display unit 570 in FIG. 2 is implemented to be included in the control center 500, but may be implemented to be separated into the operator computer 600 as illustrated in FIG. 1.

The input unit 580 receives the conditional information (the concerned area, the concerned time range, and the equipment to be searched) from a user (controller).

Figure 3:
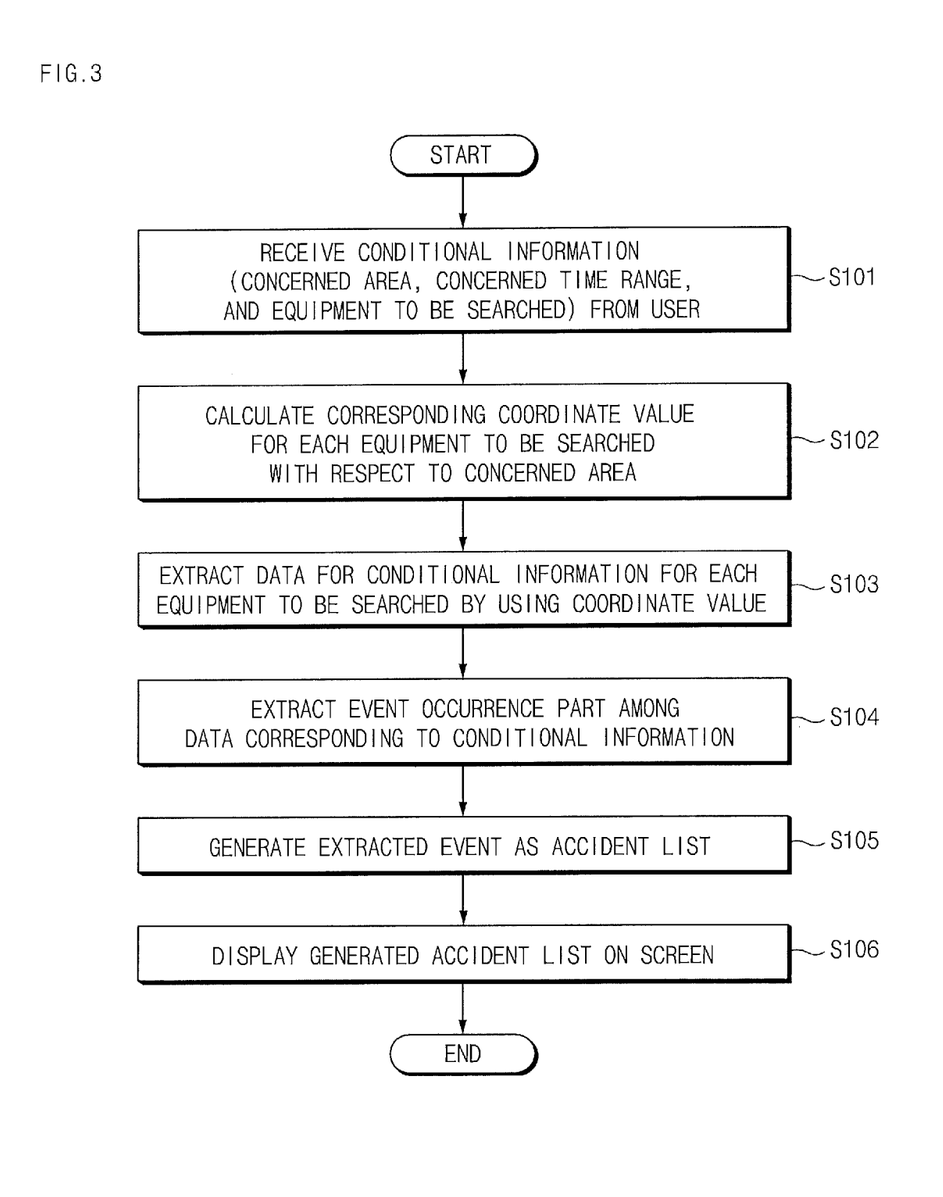
FIG. 3 is a flowchart illustrating a method for extracting marine accident data according to an exemplary embodiment of the present invention.

Hereinafter, a method for extracting marine accident data according to an exemplary embodiment of the present invention will be described in detail with reference to FIG. 3.

First, the control unit 560 receives the conditional information for generating the accident candidate list from the user through the input unit 580 (S101). In this case, the user may be the controller of the marine control center and the conditional information for generating the accident candidate list is information on the concerned area, the concerned time range, and the equipment to be searched. That is, the concerned area corresponds to a point whether an accident occurs, the concerned time range means a range of a time estimated as the time when the accident occurs, and the equipment to be searched may include the CCTV camera 400, the AIS base station 300, the radar 200, and the like. In this case, at least one equipment to be searched may be selected and all of three types of the CCTV camera 400, the AIS base station 300, and the radar 200 may be selected or one or two among them may be selected.

Thereafter, the control unit 560 calculates the corresponding coordinate value for each equipment to be searched with respect to the concerned area (S102). In this case, when the equipment to be searched is the CCTV camera 400, a camera coordinate value within the concerned area and the concerned time range is calculated, when the equipment to be searched is the radar 200, a coordinate value is calculated in radar image information within the concerned area and the concerned time range, and when the equipment to be searched is the AIS base station 300, latitude and longitude values within the concerned area and the concerned time range are calculated.

Subsequently, the control unit 560 extracts data corresponding to coordinate values calculated from data of the equipment to be searched by using the calculated coordinate values (S103). That is, data in the conditional information (the concerned area and the concerned time range) among the data of the respective equipments to be searched is extracted.

Thereafter, the control unit 560 extracts an event occurrence part among the data corresponding to the conditional information (S104).

Subsequently, the control unit 560 generates the extracted event as the accident candidate list (S105) and displays the generated accident candidate list on the screen (S106). Therefore, the user (controller) verifies the accident candidate list displayed on the screen and only data corresponding to the accident candidate list to reduce accident data verification time and efforts. In this case, the accident candidate list may be generated for each equipment. That is, each of the radar accident candidate list, the camera accident candidate list, and the AIS accident candidate list is generated and displayed on the screen to allow the controller to extract the accident data by referring to all of three lists.

That is, in regard to the image information of the CCTV camera 400, accurate image information may not be secured according to the position of an accident point and in regard to the radar signal, information on each vessel may not be verified. Therefore, in the present invention, the radar accident candidate list, the camera accident candidate list, and the AIS accident candidate list are generated by using the CCTV image information, the radar signal, and the AIS signal, respectively and the accident data is determined by referring to each accident candidate list together to increase accuracy of the accident data and more rapidly extract the accident data.

Hereinafter, a method for generating an accident candidate list of a camera image signal according to an exemplary embodiment of the present invention will be described with reference to FIG. 4.

Figure 4:
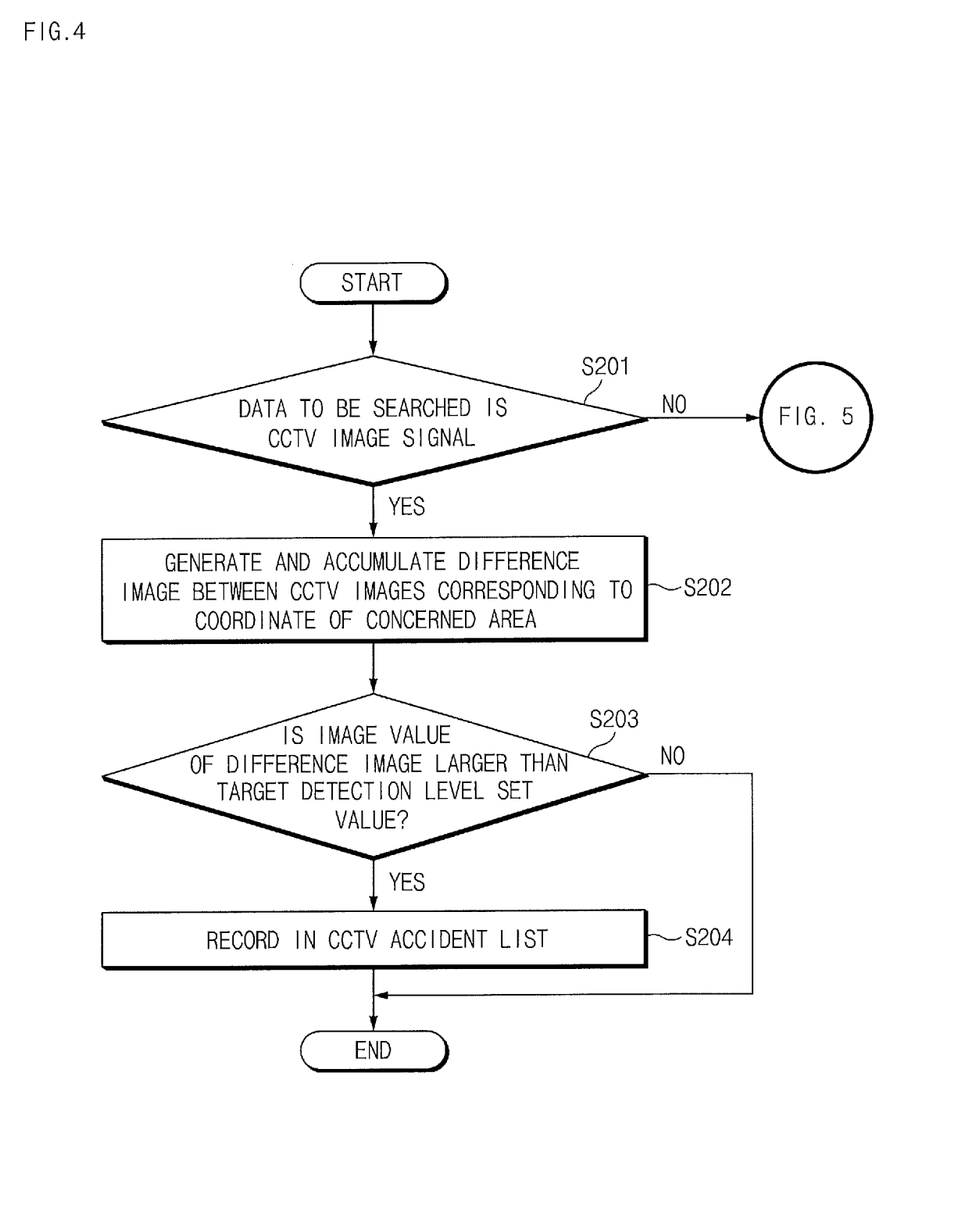
FIG. 4 is a flowchart illustrating a method for generating an accident candidate list of a camera image signal according to an exemplary embodiment of the present invention.
Figure 5:
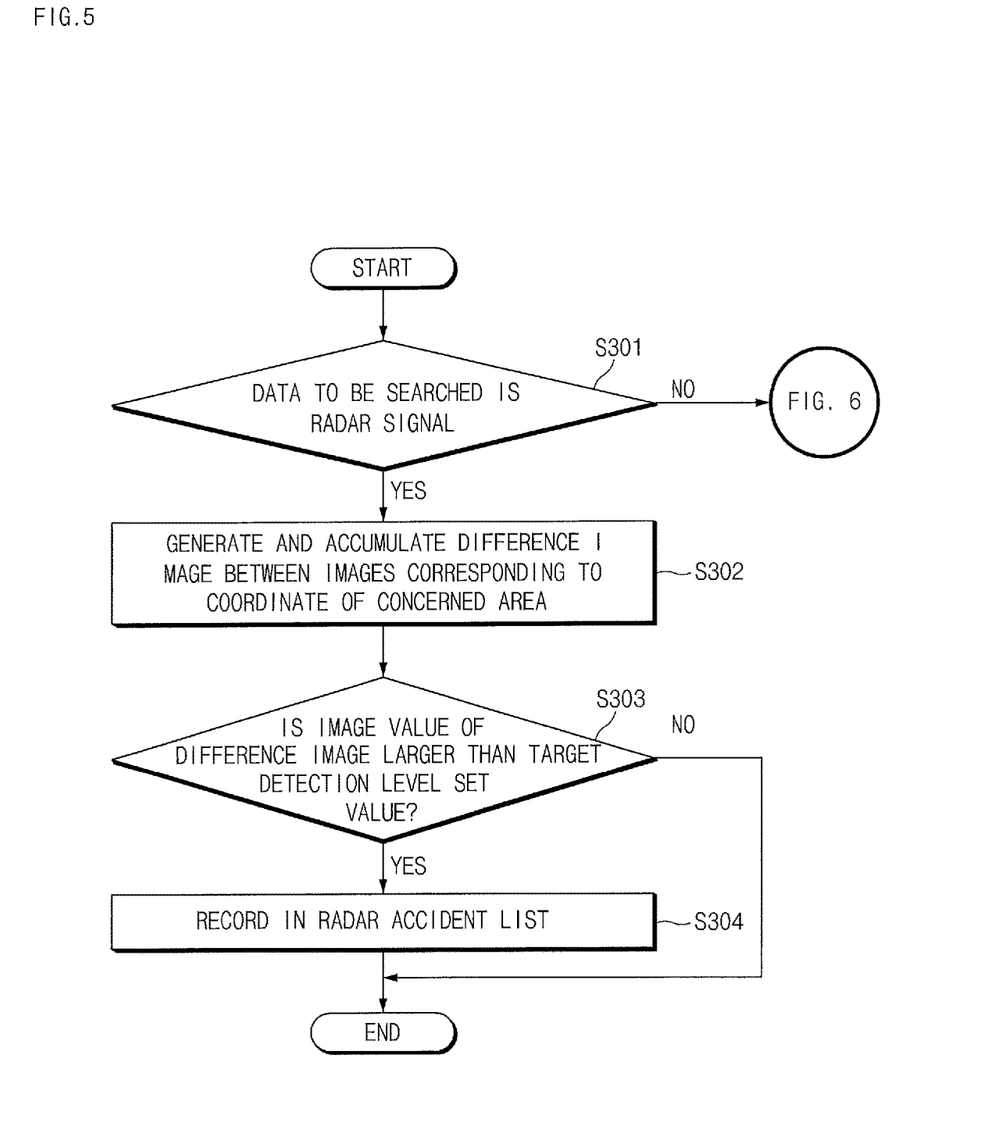
FIG. 5 is a flowchart illustrating a method for generating an accident candidate list of a radar signal according to an exemplary embodiment of the present invention.

First, the control unit 560 determines whether the equipment to be searched is the CCTV camera 400 (S201) and when the equipment to be searched is not the CCTV camera 400, the process proceeds to a procedure of FIG. 5. Meanwhile, when the equipment to be searched is the CCTV camera 400, the control unit 560 generates and accumulates the difference image of the camera image signal (CCTV image signal) corresponding to the coordinate of the concerned area (S202). In this case, the control unit 560 generates the difference image per predetermined time from the camera image signal. In this case, when the difference image is generated, an image value of an object displayed in the difference image is together generated.

Thereafter, the image value of the object displayed in the difference image is compared with a target detection level set value to determine whether the object is the target (S203). The target detection level set value means an image value to detect the object in advance. For example, when the target detection level set value is equal to or more than 50, in the case where it is set that the object is determined as the vessel in advance and when the image value of the object displayed in the difference image is equal to or less than 50, it is determined that the object is not the vessel and it is determined that the event does not occur and when the image value of the object displayed in the difference image is equal to or more than 50, it is determined that the object is the vessel and it is determined that the event occurs.

Thereafter, when the image value of the object displayed in the difference image is larger than the target detection level set value, it is determined that the vessel exists and the time and the position at which the vessel is detected in the corresponding difference image are recorded in the accident candidate list to generate a CCTV image accident candidate list (S204).

Hereinafter, a method for generating an accident candidate list of a radar signal according to an exemplary embodiment of the present invention will be described with reference to FIG. 5.

Figure 6:
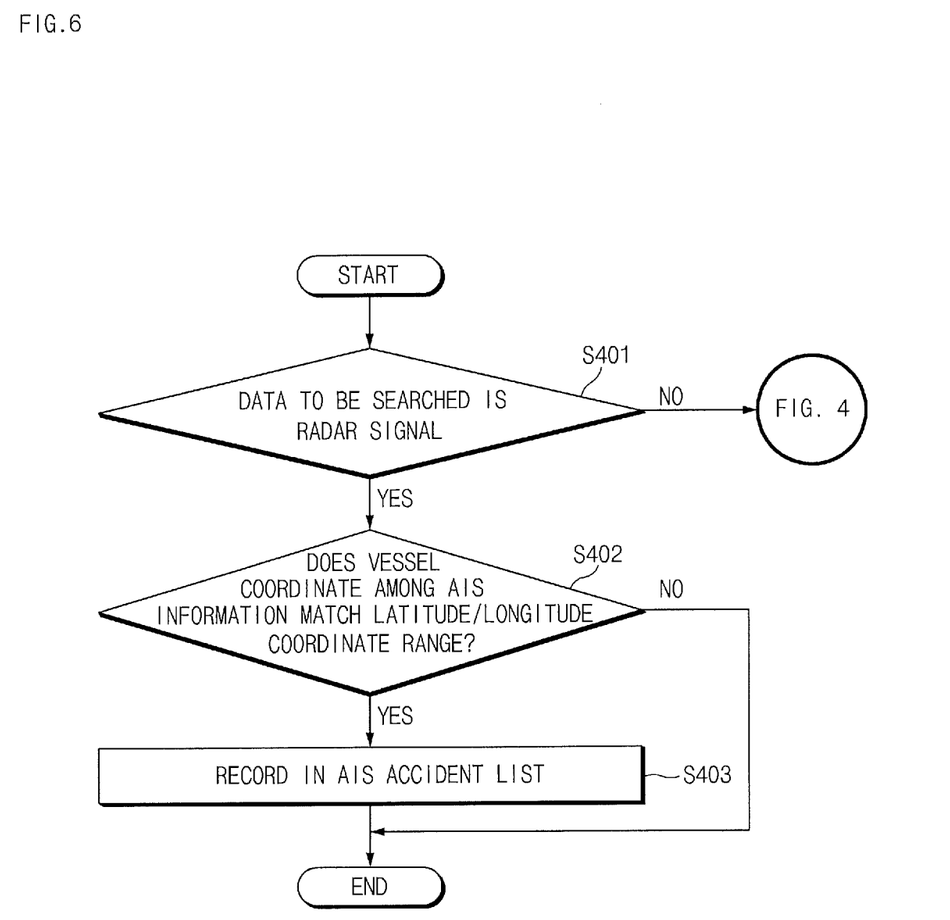
FIG. 6 is a flowchart illustrating a method for generating an accident candidate list of an AIS signal according to an exemplary embodiment of the present invention.
Figure 7:
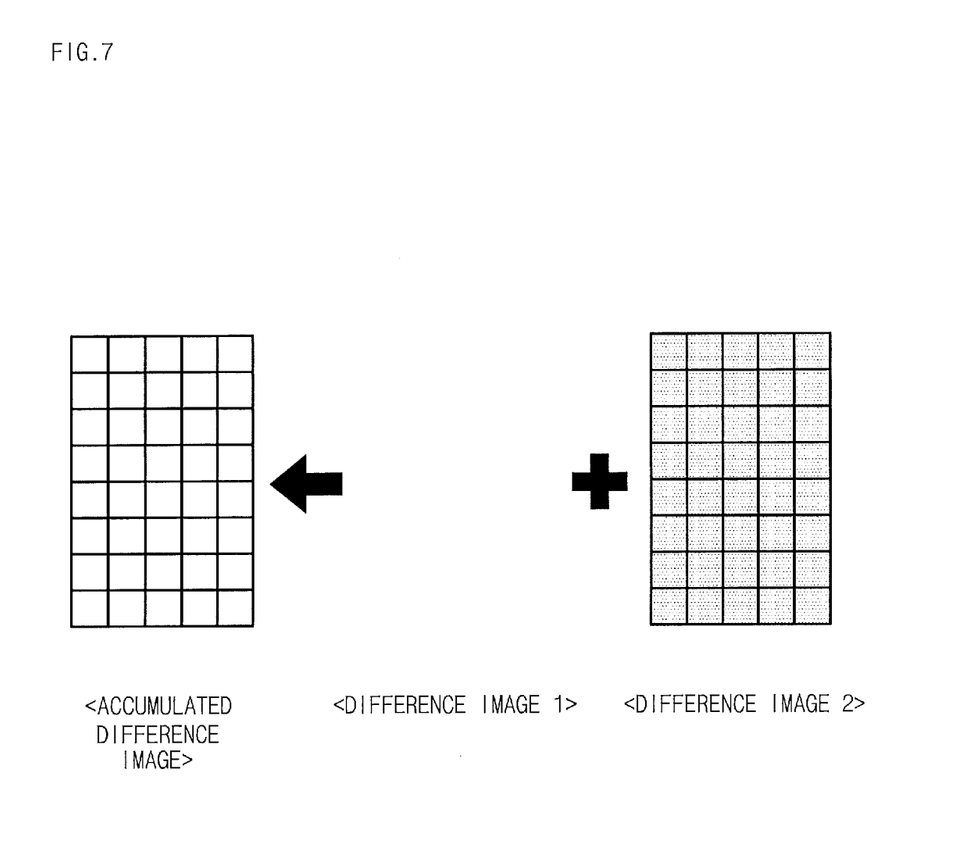
FIG. 7 is a diagram for describing a method for generating and accumulating a difference image of the radar signal.
Figure 8:
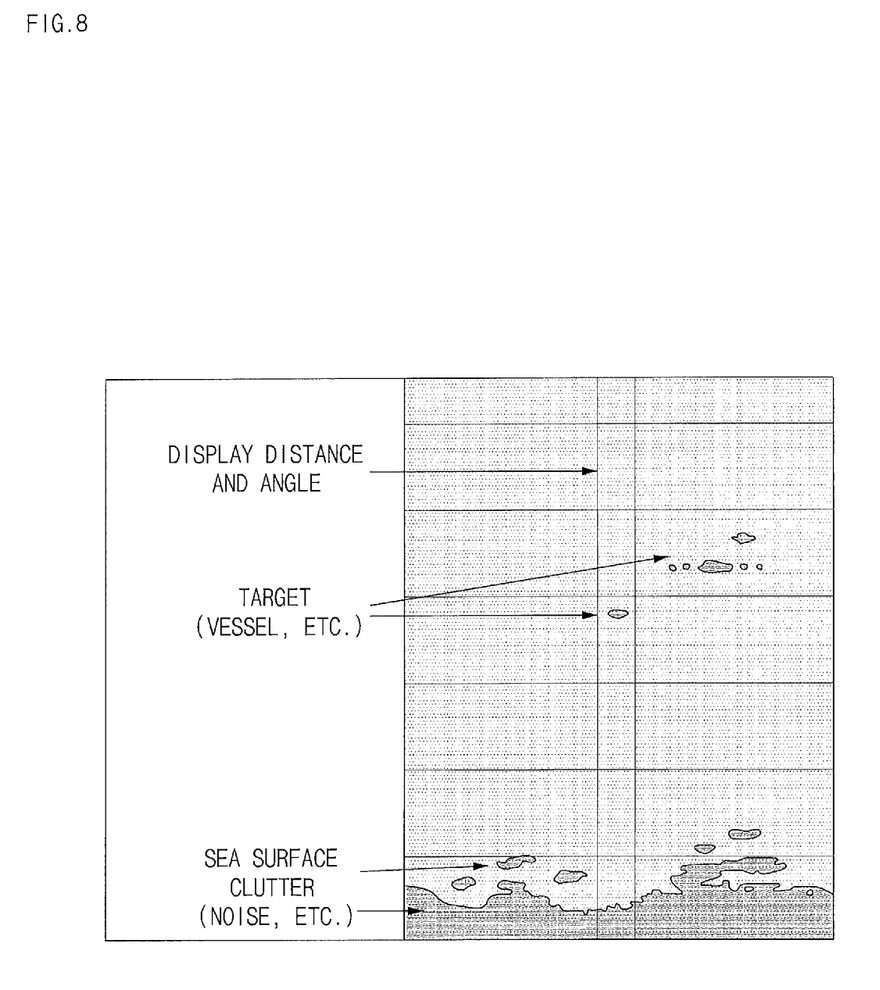
FIG. 8 is an exemplary diagram of a B-Scope image of the radar signal according to the present invention.
Figure 9:
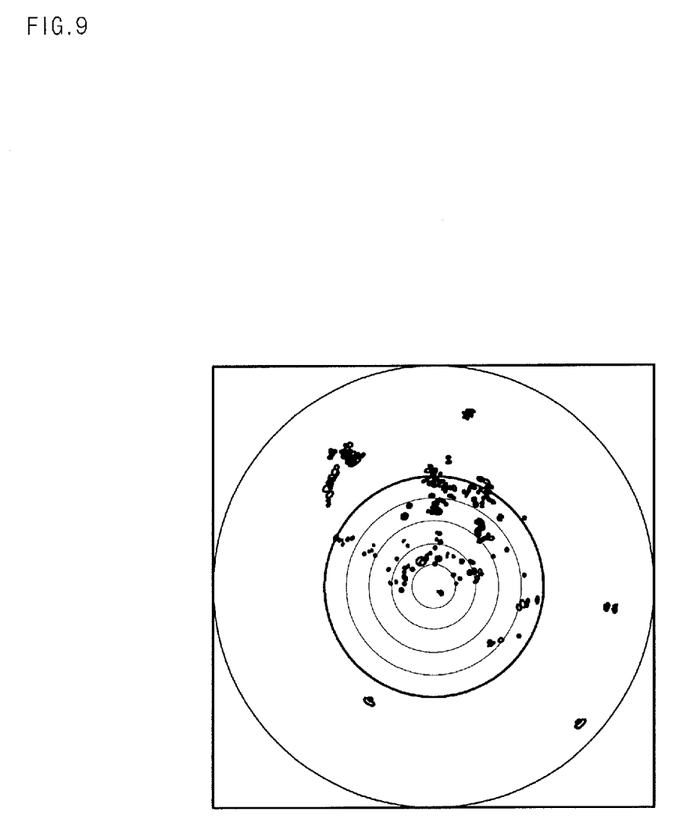
FIG. 9 is an exemplary diagram of a PPI image of the radar signal according to the present invention.

First, the control unit 560 determines whether the equipment to be searched is the radar 200 (S301) and when the equipment to be searched is not the radar 200, the process proceeds to a procedure of FIG. 6. Meanwhile, when the equipment to be searched is the radar 200, the difference image is generated by the unit of the frame and the generated difference image is generated and accumulated with respect to the image information of the concerned area in the PPI and B-scope image information received from the radar 200 (S302). In this case, the radar signal is principally stored in the B-scope image format, and a difference between echo data scanned according to a cycle of the radar 200 and echo data scanned next becomes the difference image and a difference image between next scanning operations generates a difference with an intensity value of an image, which is the intensity of a given echo as a relative value to use the value. The difference image generating method will be described below in more detail with reference to FIG. 7. That is, difference image 1 is generated, which is a difference between a current image and the previous image n-1, difference image 2 is generated, which is a difference between the previous image n-1 and the previous image n-2 of n-1, and thereafter, difference image 1 and difference image 2 are added up to generate one accumulated accumulative difference image. In this case, when the object exists in the accumulative difference image, an image value for the object part is calculated.

Thereafter, the control unit 560 compares the image value of the object displayed in the difference image and the target detection level set value (S303). That is, when the image value of the object displayed in the accumulated difference image is larger than the target detection level set value, the control unit 560 detects the time and the position in the corresponding difference image and records the detected time and position in the accident candidate list to generate the radar accident candidate list (S304).

Hereinafter, a method for generating an accident candidate list of an AIS signal according to an exemplary embodiment of the present invention will be described with reference to FIG. 6.

First, the control unit 560 determines whether the equipment to be searched is the AIS base station 300 (S401) and when the equipment to be searched is not the AIS base station 300, the process proceeds to a procedure of FIG. 4. Meanwhile, when the equipment to be searched is the AIS base station 300, it is determined whether the AIS signal including the latitude/longitude information (vessel coordinate) which matches the latitude/longitude coordinate range of the concerned area exists among the AIS signals (S402). That is, it is determined whether the AIS signal in which the latitude and the longitude belong to the latitude range and the longitude range of the concerned area exists among the AIS signals received from the AIS base station 300 and when the AIS signal in which the latitude and the longitude belong to the latitude range and the longitude range of the concerned area exists, a vessel that transmits the corresponding AIS signal may be determined as an accident target.

For example, assuming that a latitude range of the concerned area estimated that the accident occurs is 127 to 130 and a longitude range is 80 to 89, when a latitude of the received AIS signal is 129 and a longitude of the received AIS signal is 81, the latitude and the longitude are included in the latitude range and the longitude range of the concerned area, and as result, it is determined that the vessel transmitting the AIS signal including the corresponding coordinate information passes through the accident point.

When the vessel coordinate matches the latitude/longitude coordinate range of the concerned area among the AIS signals in step S402, information on the vessel transmitting the corresponding AIS signal is recorded in the accident candidate list to generate the AIS accident candidate list (S403).

As described above, according to the present invention, only a part where the event occurs is extracted from massive materials acquired by recording the accident point after the accident occurs in the sea to generate each of the camera accident candidate list, the radar accident candidate list, and the AIS accident candidate list, and as a result, all massive materials regarding the accident point are not provided to the controller, but only an accident candidate list for a specific event is provided to the controller, which allows the controller to rapidly search accident contents of the accident point.

Although the present invention described as above is not limited by the aforementioned embodiments and the accompanying drawings and it will be apparent to those skilled in the art that various substitutions, modifications, and changes can be made without departing from the technical spirit of the present invention.

What is claimed is:
1. A vessel traffic service system comprising:
an input unit receiving conditional information when a marine accident occurs from a user, and searching and extracting accident candidate data from the conditional information;
a storage unit storing at least one of an automatic identification system (AIS) signal, a radar signal, and a camera image signal; and
a control unit extracting an event occurrence part from at least one of the AIS signal, the radar signal, and the camera image signal of a point and a time at which an accident occurs in accordance with the conditional information to generate an accident candidate list,
wherein the conditional information includes information of a concerned area which is an accident occurrence point, a concerned time range which is an accident occurrence time range, and equipment to be searched that includes AIS, radar and camera systems, and
wherein in the receiving of data corresponding to the conditional information, a coordinate value is calculated for each of the equipment to be searched with respect to the concerned area.

2. The vessel traffic service system of claim 1, wherein the control unit generates and accumulates a difference image from the radar signal and records a case in which a vessel is displayed in the difference image to generate a radar accident candidate list.

3. The vessel traffic service system of claim 2, wherein the control unit generates and accumulates the difference image from the camera image signal and records the case in which a vessel is displayed in the difference image to generate a camera accident candidate list.

4. The vessel traffic service system of claim 3, wherein when a vessel coordinate which matches a latitude/longitude coordinate of the concerned area where the accident occurs is included in the AIS signal, the control unit records information on the corresponding vessel to generate an AIS accident candidate list.

5. The vessel traffic service system of claim 4, further comprising:
a display unit displaying on a screen at least on of the radar accident candidate list, the camera accident candidate list, and the AIS accident candidate list.

6. The vessel traffic service system of claim 5, wherein the display unit and the input unit are separated from the control unit to include an operator computer formed outside.

7. A method for extracting marine accident data, the method comprising:
receiving conditional information for extracting marine accident data from a user;
receiving data corresponding to the conditional information from equipment to be searched, which monitors the sea; and
extracting an event occurrence part among the data corresponding to the conditional information and recording the extracted event to generate an accident candidate list for each equipment to be searched,
wherein the conditional information includes information of a concerned area which is an accident occurrence point, a concerned time range which is an accident occurrence time range, and equipment to be searched that includes AIS, radar and camera systems, and
wherein in the receiving of data corresponding to the conditional information, a coordinate value is calculated for each of the equipment to be searched with respect to the concerned area.

8. The method of claim 7, wherein in the generating of the accident candidate list, when the data corresponding to the conditional information is a camera image signal, an interframe difference image of the camera image signal is generated and accumulated and thereafter, when a vessel exists in the difference image, a time and a position at which the vessel exists are recorded to generate a camera accident candidate list.

9. The method of claim 8, wherein when an image value of an object displayed in the difference image is larger than a predetermined target detection level value, it is determined that the object is the vessel and the vessel is recorded in the accident candidate list.

10. The method of claim 7, wherein in the generating of the accident candidate list, when the data corresponding to the conditional information is a radar signal, a difference image is generated and accumulated by the unit of scan with respect to the radar signal and thereafter, when a vessel exists in the difference image, a time and a position at which the vessel exists are recorded in the accident candidate list to generate a radar accident candidate list.

11. The method of claim 10, wherein when an image value of an object displayed in the difference image is larger than a predetermined target detection level value, it is determined that the object is the vessel and the vessel is recorded in the accident candidate list.

12. The method of claim 11, wherein in the generating of the accident candidate list, when the data corresponding to the conditional information is an AIS signal, it is determined whether the vessel exists in a range of a latitude/longitude coordinate of the concerned area among latitude/longitude coordinate values of the vessel, which are included in the AIS signal and when the vessel exists in the latitude/longitude coordinate of the concerned range, the vessel is recorded in the accident candidate list to generate the AIS accident candidate list.

13. The method of claim 7, further comprising:
displaying on the screen at least one of the accident candidate lists for each equipment to be searched.

* * * * *